(12) United States Patent
Wilson et al.

(10) Patent No.: US 6,533,835 B2
(45) Date of Patent: Mar. 18, 2003

(54) SUPPLEMENTAL FILTER FOR AN ELECTRONIC COMPONENT

(76) Inventors: Mark Wilson, 10326 S. 88th Ave., Palos Hills, IL (US) 60465; Bruce Griggs, 10326 S. 88th Ave., Palos Hills, IL (US) 60465

( * ) Notice: Subject to any disclaimer, the term of this patent is extended or adjusted under 35 U.S.C. 154(b) by 0 days.

(21) Appl. No.: 09/844,590

(22) Filed: Apr. 27, 2001

(65) Prior Publication Data

US 2002/0157360 A1 Oct. 31, 2002

(51) Int. Cl.[7] ............................................... B01D 46/10
(52) U.S. Cl. ...................... 55/481; 55/385.1; 55/385.6; 55/482; 55/496; 55/506; 55/DIG. 31
(58) Field of Search ........................... 55/385.1, 385.6, 55/481, 482, 496, 506, 529, DIG. 31

(56) References Cited

U.S. PATENT DOCUMENTS

| | | | | | |
|---|---|---|---|---|---|
| 1,112,437 A | * | 10/1914 | Sweeney | ............... | 137/247.45 |
| 3,971,877 A | * | 7/1976 | Lee | ............... | 55/491 |
| 4,889,542 A | * | 12/1989 | Hayes | ............... | 55/385.6 |
| 4,925,468 A | * | 5/1990 | Kishi et al. | ............... | 55/483 |
| 5,232,478 A | * | 8/1993 | Farris | ............... | 55/356 |
| 5,462,569 A | * | 10/1995 | Benjamin | ............... | 55/385.6 |
| 5,492,551 A | * | 2/1996 | Wolfe | ............... | 55/496 |
| 5,766,316 A | * | 6/1998 | Gates | ............... | 55/385.6 |
| 5,827,340 A | * | 10/1998 | Fiske | ............... | 55/385.6 |
| 5,931,988 A | * | 8/1999 | LeBlanc et al. | ............... | 55/484 |
| 6,039,777 A | * | 3/2000 | Lee | ............... | 55/DIG. 31 |
| 6,284,010 B1 | * | 9/2001 | Rehmert | ............... | 55/385.6 |

* cited by examiner

*Primary Examiner*—Duane Smith
*Assistant Examiner*—Jason M. Greene
(74) *Attorney, Agent, or Firm*—Goldstein & Lavas, P.C.

(57) ABSTRACT

A supplemental filter for an electronic component including a frame portion having a generally U-shaped configuration. The frame portion has a pair of vertical supports having upper and lower ends. The lower ends have a horizontal support extending therebetween. The pair of vertical supports and the horizontal support define a receiving channel. The frame portion is securable to an electronic component with the receiving channel positioned over the vent thereof. A foam filter is dimensioned for being slidably received within the frame portion.

4 Claims, 4 Drawing Sheets

SUPPLEMENTAL FILTER FOR AN ELECTRONIC COMPONENT

BACKGROUND OF THE INVENTION

The present invention relates to a supplemental filter for an electronic component and more particularly pertains to preventing dust and dirt front entering an electronic component through a vent thereof.

The use of air filter devices is known in the prior art. More specifically, air filter devices heretofore devised and utilized for the purpose of filtering air are known to consist basically of familiar, expected and obvious structural configurations, notwithstanding the myriad of designs encompassed by the crowded prior art that have been developed for the fulfillment of countless objectives and requirements.

By way of example, U.S. Pat. No. 4,889,542 to Hayes discloses a foam air filter panel capable of being attached to the outside of a computer housing to cover the intake grids and prevent the accumulation of dust; however, the filter appears attached with an adhesive. U.S. Pat. No. 5,766,316 to Gates discloses a filter support device for attachment to a computer for cleaning the cooling air supply pulled into the housing by a fan. U.S. Pat. No. 3,971,877 to Lee discloses a removable filter attached to an electronic chassis with a series of barbs.

While these devices fulfill their respective, particular objective and requirements, the aforementioned patents do not describe a supplemental filter for an electronic component for preventing dust and dirt front entering an electronic component through a vent thereof.

In this respect, the supplemental filter for an electronic component according to the present invention substantially departs from the conventional concepts and designs of the prior art, and in doing so provides an apparatus primarily developed for the purpose of preventing dust and dirt front entering an electronic component through a vent thereof.

Therefore, it can be appreciated that there exists a continuing need for a new and improved supplemental filter for an electronic component that can be used for preventing dust and dirt front entering an electronic component through a vent thereof. In this regard, the present invention substantially fulfills this need.

SUMMARY OF THE INVENTION

In the view of the foregoing disadvantages inherent in the known types of air filter devices now present in the prior art, the present invention provides an improved supplemental filter for an electronic component. As such, the general purpose of the present invention, which will be described subsequently in greater detail, is to provide a new and improved supplemental filter for an electronic component that has all the advantages of the prior art and none of the disadvantages.

To attain this, the present invention essentially comprises a frame portion having a generally U-shaped configuration. The frame portion has a pair of vertical supports having upper and lower ends. The lower ends have a horizontal support extending therebetween. The pair of vertical supports and the horizontal support define a receiving channel. The frame portion is securable to an electronic component with the receiving channel positioned over the vent thereof. Rear surfaces of the vertical supports have an adhesive disposed thereon to facilitate securement to the electronic component. A foam filter is dimensioned for being slidably received within the frame portion. The foam filter comprises a first filter and a second filter hingedly coupled along corresponding lateral edges. The first filter is foldable against the second filter for being slidably positioned within the receiving channel of the frame portion. A pair of inverted L-shaped brackets are removably received within the upper ends of the vertical supports of the frame portion for containing the foam filter within the receiving channel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved supplemental filter for an electronic component that has all the advantages of the prior art air filter devices and none of the disadvantages.

It is another object of the present invention to provide a new and improved supplemental filter for an electronic component that may be easily and efficiently manufactured and marketed.

It is a further object of the present invention to provide a new and improved supplemental filter for an electronic component that is of durable and reliable construction.

An even further object of the present invention is to provide a new and improved supplemental filter for an electronic component that is susceptible of a low cost of manufacture with regard to both materials and labor, and which accordingly is then susceptible of low prices of sale to the consuming public, thereby making such a supplemental filter for an electronic component economically available to the buying public.

Even still another object of the present invention is to provide a new and improved supplemental filter for an electronic component for preventing dust and dirt front entering an electronic component through a vent thereof.

Lastly, it is an object of the present invention to provide a new and improved supplemental filter for an electronic component including a frame portion having a generally U-shaped configuration. The frame portion has a pair of vertical supports having upper and lower ends. The lower ends have a horizontal support extending therebetween. The pair of vertical supports and the horizontal support define a receiving channel. The frame portion is securable to an electronic component with the receiving channel positioned over the vent thereof. A foam filter is dimensioned for being slidably received within the frame portion.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
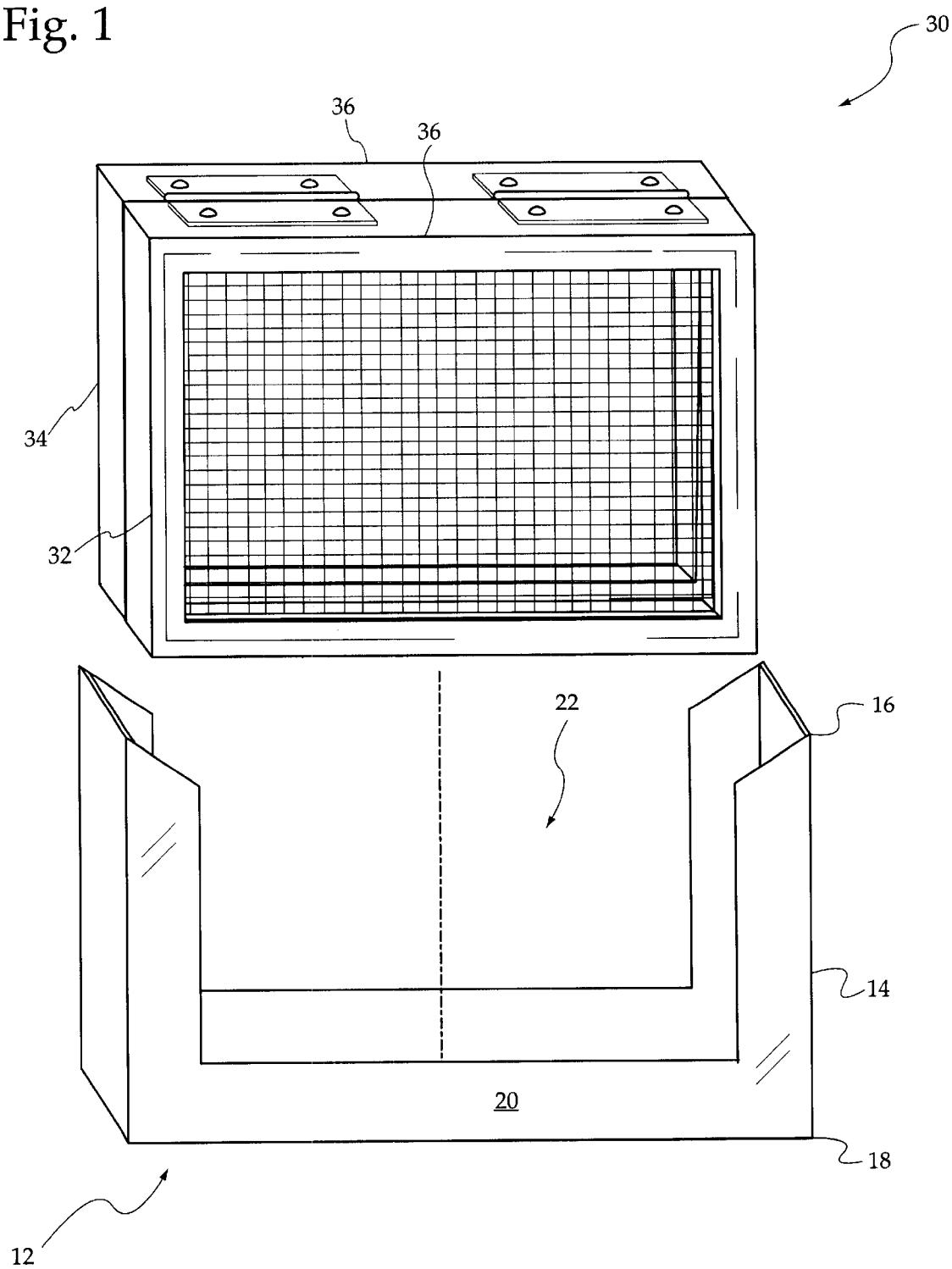
FIG. 1 is a perspective view of the preferred embodiment of the supplemental filter for an electronic component constructed in accordance with the principles of the present invention.
Figure 2:
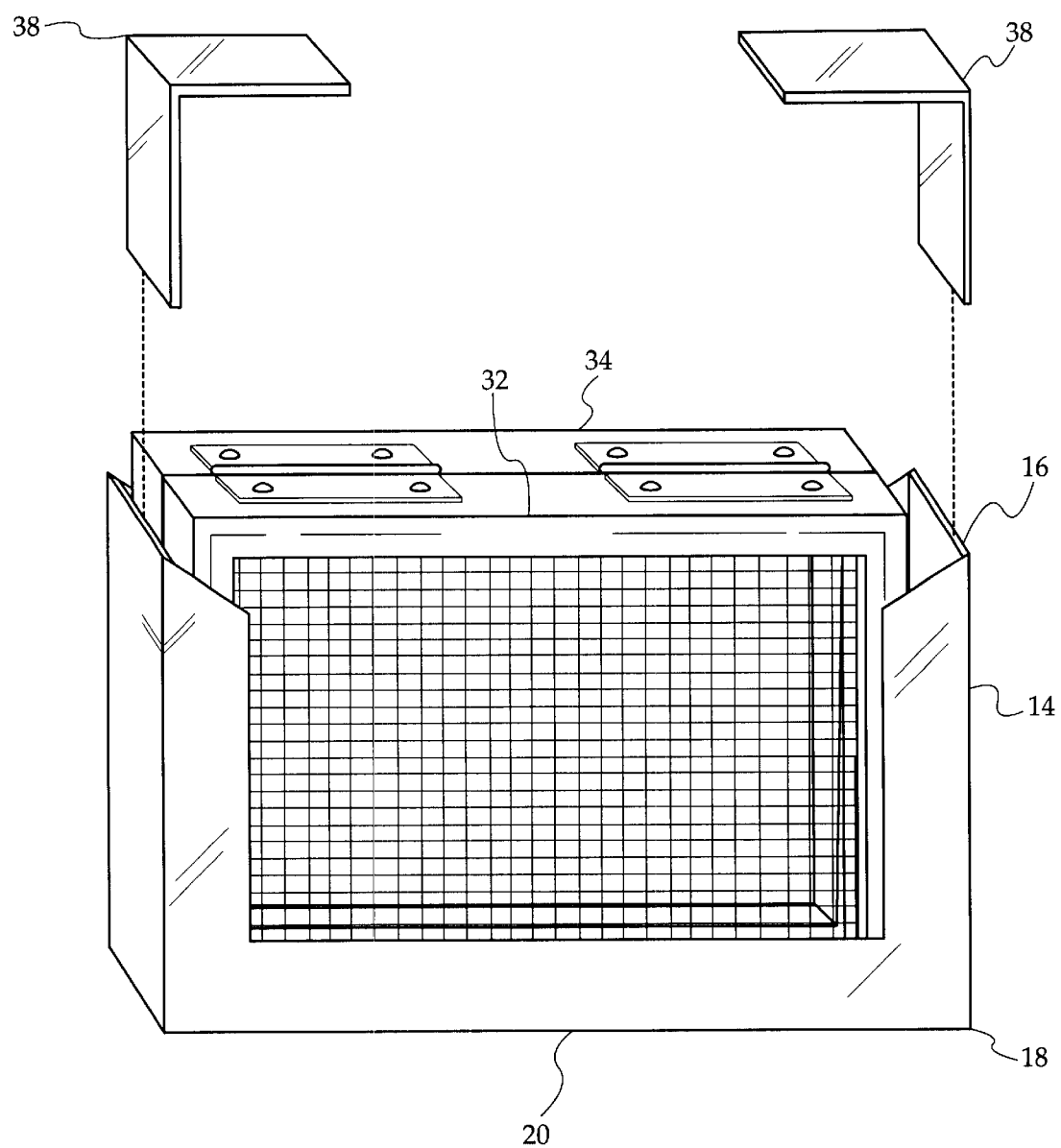
FIG. 2 is a front view of the present invention illustrating the use of the clips thereof.
Figure 3:
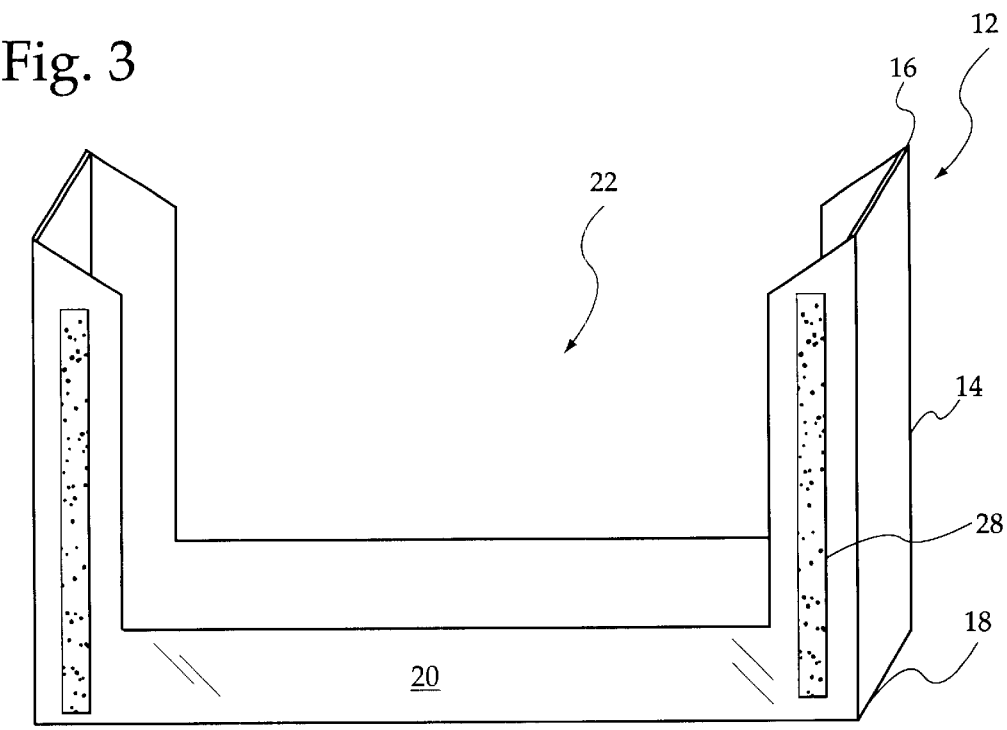
FIG. 3 is a rear view of the frame of the present invention.
Figure 4:
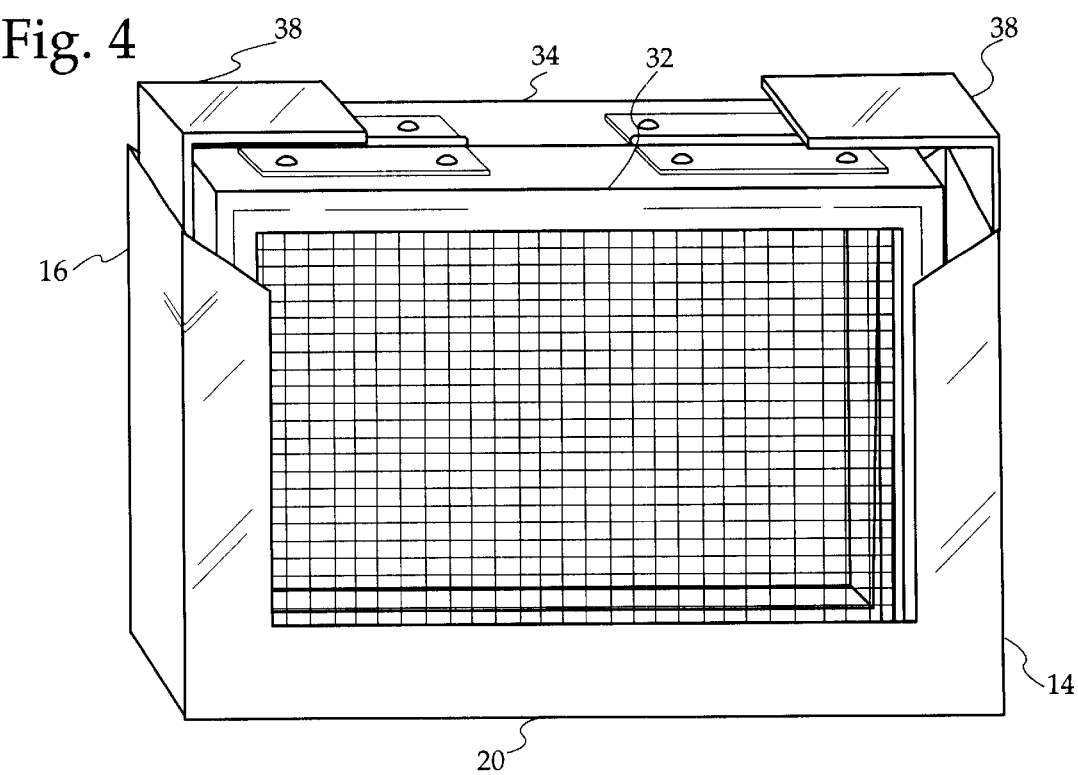
FIG. 4 is a front view of the present invention in a fully assembled orientation.
Figure 5:
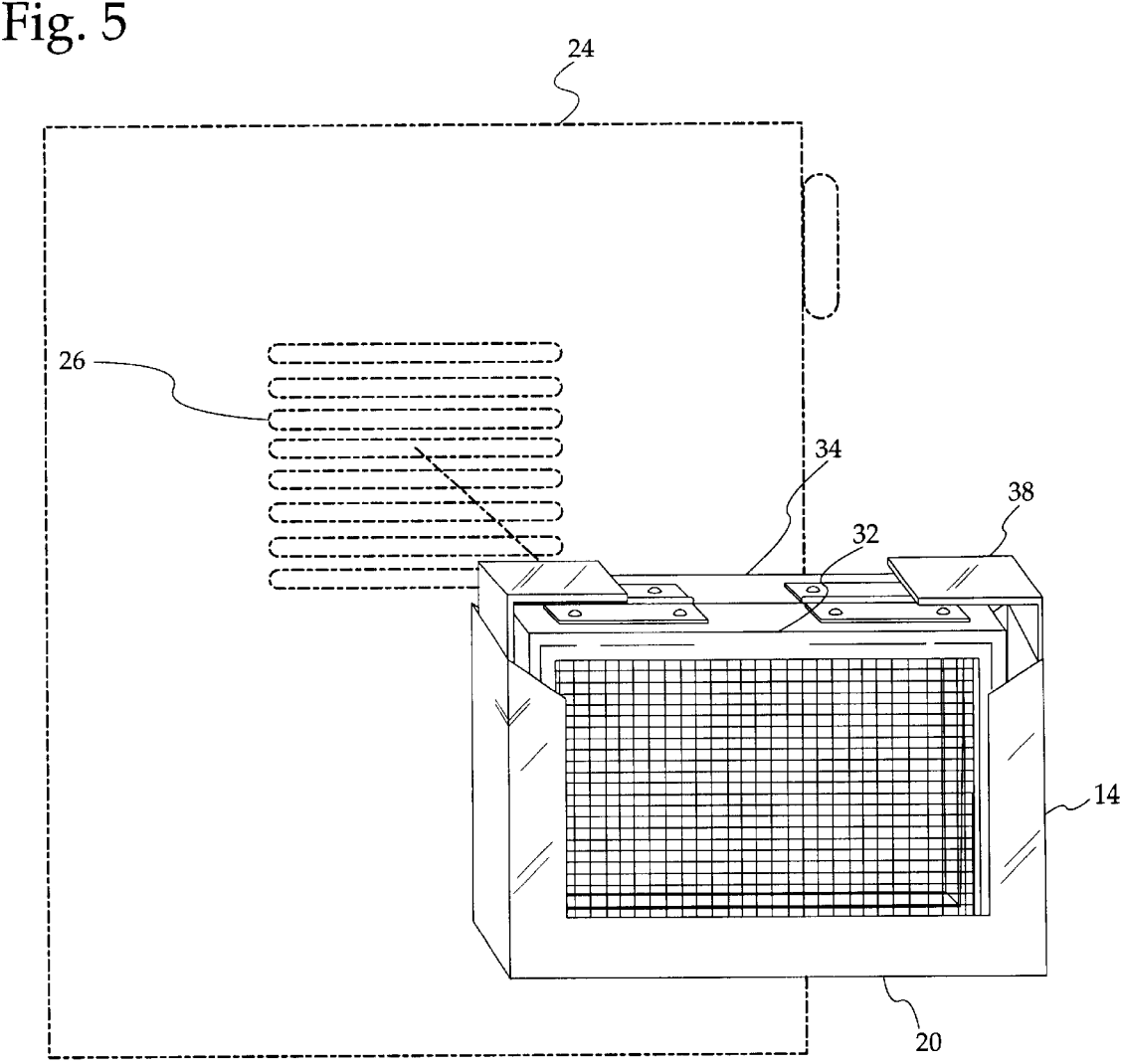
FIG. 5 is a perspective view of the present invention illustrated being coupled with an air vent of an electronics component.

With reference now to the drawings, and in particular, to figures one through five thereof, the preferred embodiment of the new and improved supplemental filter for an electronic component embodying the principles and concepts of the present invention and generally designated by the reference number 10 will be described.

Specifically, it will be noted in the various figures that the device relates to a supplemental filter for an electronic component for preventing dust and dirt front entering an electronic component through a vent thereof. In its broadest context, the device consists of a frame portion, a foam filter, and a pair of inverted L-shaped brackets. Such components are individually configured and correlated with respect to each other so as to attain the desired objective.

The frame portion 12 has a generally U-shaped configuration. The frame portion 12 could be constructed in one size or in a variety of sizes. The one size would be adapted to allow the end user to cut the frame portion 12 to the proper size. The frame portion 12 has a pair of vertical supports 14 having upper 16 and lower ends 18. The lower ends 18 have a horizontal support 20 extending therebetween. The pair of vertical supports 14 and the horizontal support 20 define a receiving channel 22. The frame portion 12 is securable to an electronic component 24 with the receiving channel 22 positioned over the vent 26 thereof. Rear surfaces of the vertical supports 14 have an adhesive 28 disposed thereon to facilitate securement to the electronic component 24.

The foam filter 30 is dimensioned for being slidably received within the frame portion 12. The foam filter 30 comprises a first filter 32 and a second filter 34 hingedly coupled along corresponding lateral edges 36. The first filter 32 is foldable against the second filter 34 for being slidably positioned within the receiving channel 22 of the frame portion 12.

The pair of inverted L-shaped brackets 38 are removably received within the upper ends 16 of the vertical supports 14 of the frame portion 12 for containing the foam filter 30 within the receiving channel 22.

In use, the frame portion 12 is adjusted to properly fit the vent 26 of the component 24 whereupon the frame portion 12 is secured to the component 24 with the receiving channel 22 positioned over the vent 26. The foam filter 30 is then folded for positioning within the receiving channel 22. The filter 30 will prevent dirt and other airborne debris from entering the component 24 through the vent 26. This will prolong the life of the component 24. When the filter 30 has become saturated, it can be removed and replaced with a new filter 30 while the frame portion 12 remains in place.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A supplemental filter for an electronic component for preventing dust and dirt from entering an electronic component through a vent thereof comprising, in combination:

a frame portion having a generally U-shaped configuration, the frame portion having a pair of vertical supports having upper and lower ends, the lower ends having a horizontal support extending therebetween, the pair of vertical supports and the horizontal support defining a receiving channel, the frame portion being securable to an electronic component with the receiving channel positioned over the vent thereof, rear surfaces of the vertical supports having an adhesive disposed thereon to facilitate securement to the electronic component;

a foam filter dimensioned for being slidably received within the frame portion, the foam filter being comprised of a first filter and a second filter hingedly coupled along corresponding lateral edges, the first filter being foldable against the second filter for being slidably positioned within the receiving channel of the frame portion; and a pair of inverted L-shaped brackets removably received within the upper ends of the vertical supports of the frame portion for containing the foam filter within the receiving channel.

2. A supplemental filter for an electronic component for preventing dust and dirt from entering an electronic component through a vent thereof comprising, in combination:

a frame portion having a generally U-shaped configuration, the frame portion having a pair of vertical supports having upper and lower ends, the lower ends having a horizontal support extending therebetween, the pair of vertical supports and the horizontal support defining a receiving channel, the frame portion being securable to an electronic component with the receiving channel positioned over the vent thereof; and a foam filter dimensioned for being slidably received within the receiving channel of the frame portion, the foam filter being comprised of a first filter and a second filter hingedly coupled along corresponding lateral edges, the first filter being foldable against the second filter for being slidably positioned within the receiving channel of the frame portion.

3. The supplemental filter for an electronic component as set forth in claim 2, wherein rear surfaces of the vertical supports of the frame portion have an adhesive disposed thereon to facilitate securement to the electronic component.

4. A supplemental filter for an electronic component for preventing dust and dirt from entering an electronic component through a vent thereof comprising, in combination:

a frame portion having a generally U-shaped configuration, the frame portion having a pair of vertical supports having upper and lower ends, the lower ends having a horizontal support extending therebetween, the pair of vertical supports and the horizontal support defining a receiving channel, the frame portion being securable to an electronic component with the receiving channel positioned over the vent thereof;

a foam filter dimensioned for being slidably received within the receiving channel of the frame portion; and a pair of inverted L-shaped brackets removably received within the upper ends of the vertical supports of the frame portion for containing the foam filter within the receiving channel.

* * * * *